Feb. 15, 1966 P. A. STEVENS ETAL 3,234,944
HYPODERMIC NEEDLE AND SUPPORT STRUCTURE THEREFOR
Filed Dec. 10, 1962
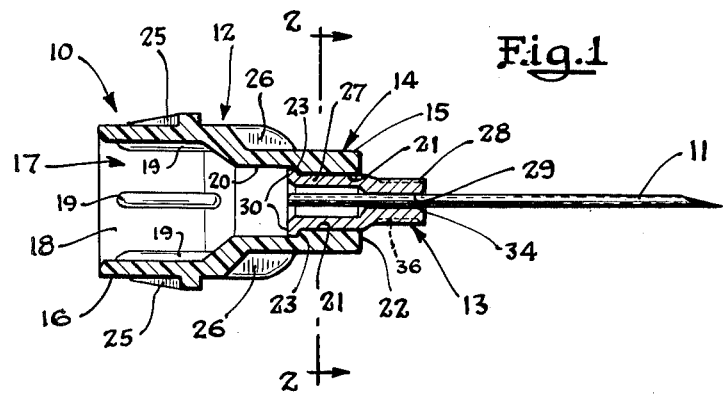
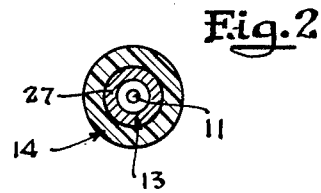
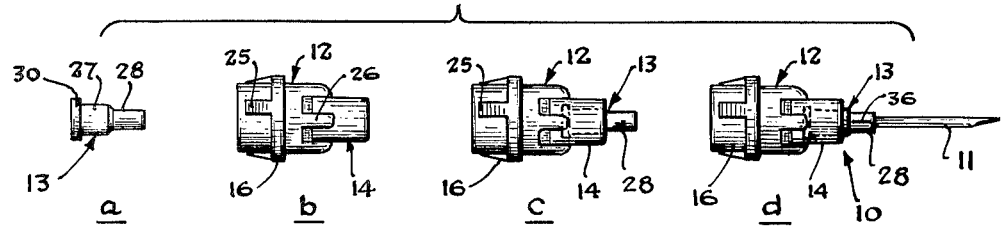
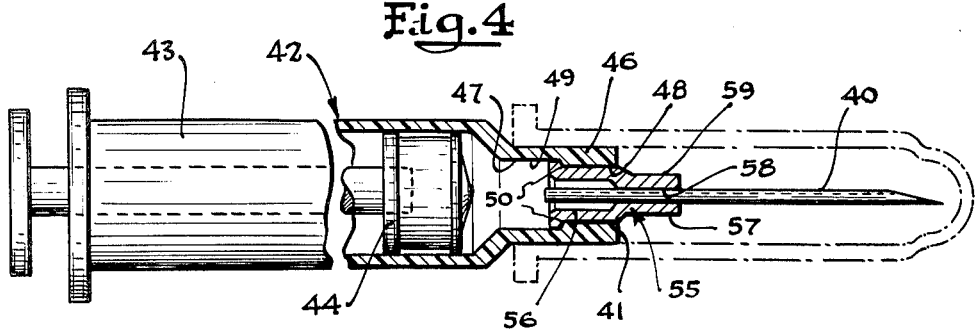
Inventors
Peter A. Stevens
Donald W. Utting
By Hibben, Noyes & Bicknell
Attorneys

United States Patent Office 3,234,944
Patented Feb. 15, 1966

3,234,944
HYPODERMIC NEEDLE AND SUPPORT
STRUCTURE THEREFOR
Peter A. Stevens, Waterbury, Conn., and Donald W.
Utting, De Land, Fla., assignors to Roehr Products
Company, Inc., De Land, Fla., a corporation of
Delaware
Filed Dec. 10, 1962, Ser. No. 243,573
3 Claims. (Cl. 128—221)

The present invention relates generally to a method and means of supporting a cannula in a preformed member and more particularly to an improved method and means of securing a metal hypodermic needle cannula in a preformed plastic hub member or other cannula supporting structure adapted for medicinal use.

In attempting to secure a metal cannula in a preformed non-metallic cannula supporting structure, such as a molded plastic hypodermic needle hub or syringe structure wherein the cannula engaging portion of the non-metallic structure cannot be compressed or deformed into permanent locking engagement about the said metal cannula without melting the plastic to sealably hold the cannula against both axial and rotary movement, considerable difficulty has been encountered in providing suitable means for mounting a metal cannula in a non-metallic cannula supporting structure. It has also been a problem to find a satisfactory means for securing a sharp pointed cannula in a cannula supporting structure which is suitable for use with high-speed automatic assembly mechanism and yet does not cause damage to the point of the cannula and which is also sufficiently economical to be employed for producing a disposable or single use hypodermic needle or a like article of manufacture.

Among the various means heretofore suggested for fixedly and sealably supporting a metal cannula in a non-metallic cannula supporting member, such as a molded plastic hub, have been to roughen an outer surface portion of the cannula or forming a protuberance on an outer surface portion of the cannula which the plastic engages when the hub section is molded about an end of the cannula. More recently, it has been suggested that a recess or passage be cut in the wall of the cannula to provide a key which locks the plastic hub section to the cannula. It will be evident that the necessity of working a surface portion of each of the cannulae as required in the foregoing suggested means in addition to providing a pointed end thereon requires additional handling of the cannulae which is expensive and tends to increase losses due to damaging the fragile point of the cannulae. It is also inherent in each of the foregoing methods of securing a cannula in a plastic hub section that the cannulae pass through a molding apparatus in order to form the plastic hub section about the cannula. The likelihood of damaging the cannula, particularly a sharply pointed cannula, is greatly increased during the handling incidental to passage of a cannula through the molding apparatus. Thus, it would be desirable to avoid having to mold the hub about the cannula.

It is therefore an object of the present invention to provide an improved and more economical means of mounting a cannula in a preformed cannula supporting member.

It is also an object of the present invention to provide an improved and more economical means of securely mounting a cannula in a preformed cannula supporting member without providing a rough surface portion, a recess, or a protuberance on an outer surface portion of the cannula.

It is still a further object of the present invention to provide a fast, economical, and dependable means and method of mounting a sharpened hypodermic needle cannula in a preformed hypodermic needle support member which minimizes damaging said sharpened end of the cannula.

It is a still further object of the present invention to provide an improved means and method of mounting a metal hypodermic needle cannula in a preformed plastic hub section which avoids the necessity of melting the plastic or using a cement in order to join the hub to the cannula.

It is also an object of the present invention to provide an improved means and method of securing a metal hypodermic needle cannula in a preformed plastic hub or cannula retaining member which makes practical and economically feasible the assembly of a sharpened cannula in said preformed hub or cannula retaining member.

The manner and means by which the foregoing objects of the present invention are achieved will be apparent from the detailed description and claims to follow when read in conjunction with the accompanying drawing wherein;

FIGURE 1 is a side elevational view partially in vertical section showing a hypodermic needle hub assembly embodying the present invention.

FIGURE 2 is a sectional view along the line 2—2 of FIGURE 1.

FIGURE 3 is a composite schematic elevational view of the parts of the hub assembly of FIG. 1 in various stages of assembly.

FIGURE 4 is a side elevational view partially in vertical section showing a modified form of the present invention.

As illustrated in FIGS. 1 and 2 of the drawing, a hypodermic needle cannula hub assembly 10 adapted for detachably mounting on a threaded discharge outlet of a hypodermic needle syringe is comprised of a hypodermic needle cannula 11 securely and sealably mounted in a preformed hypodermic needle cannula hub or support member 12 having a tubular eyelet member or section 13 fixedly mounted in the said support member 12 with said eyelet member 13 fixedly and sealably engaging a peripheral portion of the cannula 11 at a point spaced from at least one end thereof.

The cannula supporting member 12, preferably molded of polypropylene plastic or the like, is comprised of a main body section 14 which has means for fixedly retaining a cannula 11 associated therewith and has an axially extending rigid wall section 16 adapted for detachably engaging a hypodermic syringe outlet. The support member 12 has an axial passage 17 which extends longitudinally through the end walls of said body section 14. The distal portion 18 of the axial passage 17 preferably has a diameter slightly larger than the outer diameter of a male discharge outlet of a syringe on which the assembly 10 is adapted to be mounted. Also, a plurality of longitudinally extending deformable splines 19 are preferably formed on the inner surface of the skirt section 16 to facilitate mounting the assembly 10 on a threaded discharge outlet. When the assembly 10 is to be used with a hypodermic syringe having a Luer tapered discharge outlet, however, a Luer taper can be provided on the skirt section 16.

The support member 12 can, if desired, also have formed on the outer surface of the wall section 16 a plurality of longitudinally extending deformable splines 25 for engaging internal threads on a discharge outlet of a hypodermic syringe. Also, if desired, the outer surface of the main body section 14 can be provided with one or more radially extending projections 26 to serve as gripping means to facilitate mounting the assembly 10 on an outlet of a syringe or the like. The lower outer surface 15 of the body section 14 can, if desired, have a cylindrical form which is adapted to sealably support a protective sheath for enclosing the end portion of the cannula 11 extending beyond the hub or support member 12.

The intermediate portion 20 of the axial passage 17 which extending through the main body section 14 preferably has a diameter less than the portion 18 of the passage in the adjacent wall section 16. In the preferred form of the support member 12, the intermediate portion 20 of the axial passage 17 is provided with an axial reduced diameter end wall passage 21 which extends through the end wall 22 of the main body section 14 to provide a tapered shoulder section 23 within the body section 14.

The tubular eyelet member 13 which is adapted to be fixedly and sealably mounted in the support member 12 is formed preferably of a cylindrical metal body portion 27 and a preferably cylindrical metal extension stem section 28 with a tubular axial passage 29 extending the length thereof. The end of the body portion 27 opposite the stem section 28 is preferably provided with an outwardly extending flange 30 which is adapted to engage the shoulder section 23 of the main body section 14. In the preferred form of the eyelet member 13 the cylindrical body portion 27 has an outer diameter which is normally slightly larger than the inner diameter of the passage 21 in the body section 14 so that the eyelet member 13 can be fixedly and sealably engaged in the body section 14 when the cylindrical body portion 27 is forcibly seated in the passage 21 with the flange 30 engaging the shoulder section 23. The cylindrical body portion 27 preferably has a length about equal to the length of the stem section 28.

The extension stem section 28 in the preferred form has an outer diameter slightly smaller than the body portion 27 with the axial passage 29 extending therethrough of a diameter which is only slightly greater than the outer diameter of the cannula 11, whereby the cannula 11 can be readily inserted therein but requires only a slight reduction of the inner diameter of the axial passage 29 in order for the stem section 28 to sealably and fixedly engage the cannula 11. The proximal end of the passage 29 is provided with a slightly lead-in radius 34 to facilitate insertion of the cannula 11 into the end of the eyelet section 13.

The eyelet member 13 is preferably drawn on a conventional eyelet machine, the details of which are well known and form no part of the present invention. The eyelet member 13 is also preferably drawn from flat sheet metal stock which is relatively malleable and which is preferably softer than the metal of the stainless steel cannula tube mounted in the stem section. By way of example but not as a limitation, the metal stock can be the standard types designated as 1100 or 3003 aluminum sheet metal stock material. These materials formerly have been known as 2S and 3S aluminum. Type 1100 is sometimes called commercially pure aluminum while type 3003 has similar properties but a higher tensile strength since it is alloyed with about 1.2% manganese. Stock materials such as these are not satisfactory as a screw machine stock since they are difficult to machine at a high rate of speed by reason of the fact that they tend to load the tool and tear during the machine operation. However, these stock materials are highly satisfactory for drawing and are considerably less expensive than the conventional aluminum screw machine stock material. Also, this screw machine stock material is ordinarily type 2011T3 (formerly type 11ST3) aluminum stock and contains about 5.5% copper, 0.5% lead and 0.5% bismuth which render this material more corrosive than the types 1100 and 3003.

In the eyelet drawing operation no slivers of metal are formed which might become lodged within the eyelet member 13. Furthermore, the drawing operation produces an eyelet having highly accurate tolerances and always insures that the passage 29 is precisely located so that when the cannula 11 is brought by mechanical means into position for assembly with the support member 12, the cannula 11 can be inserted into the passage 29 by high speed automatic machining without damaging the cannula.

As a result of the metal drawing operation the eyelet member 13 will be cold-worked to produce a finer grained metal which is harder than the original stock material. Thus, when the stem 28 of the eyelet member 13 is crimped upon the inserted cannula 11, the hardened stem 28 provides a firm frictional grip on the cannula 11 and prevents it from becoming loosened from its mounted position within the passage 29. The eyelet member 13 can, of course, be formed by a screw machine operation. When the eyelet 13 is formed on a screw machine, however, there is no work hardening of the stem 28 with the result that the grip on the cannula is not as great as the grip when the eyelet 13 is drawn.

In combining the parts to form the complete hub assembly 10 in accordance with the preferred mode of operation, the hub section 12 is mounted in a suitable support means and the eyelet member 13 is inserted into the axial passage 17 through the distal portion 18 (see FIG. 3) and forcibly seated in the passage 21 with the flange 30 in engagement with the shoulder 23 of the main body section 14 wherein the eyelet member 13 is securely and sealably held by frictional engagement. If desired, the eyelet 13 can be spun into position in the passage 17 rather than by forcing the eyelet into position. Since the plastic of the body section 14 contiguous with the eyelet melts during the spinning operation and hardens about the eyelet 13, a good sealing engagement is formed without danger of splitting the body section. Either of the foregoing assembly operations can be performed by automatic mechanism which continually feeds and assembles the respective parts.

It is also within the scope of the present invention, of course, to provide the hub section 12 with the eyelet section 13 sealably and fixedly disposed therein by molding the hub section 12 about the eyelet section 13 with the stem section 28 extending axially beyond the end of the body section 14. In the latter mode, the separate assembly step of inserting the eyelet section 13 into the body section 14 can be eliminated without in any way interfering with the utility of the structure and the resultant assembly can be used in the same manner to accomplish all the objects of the present invention.

Thereafter the hub section 12 with an eyelet member 13 fixedly mounted or disposed therein while held in the foregoing support means or at a subsequent assembly station (in the event the hub section 12 with eyelet section 13 mounted therein is not immediately assembled with a cannula) is combined with a pointed cannula 11 by inserting said cannual 11 into the proximal end of the passage 29 at 34. The distal end of the cannula 11 can, if desired, extend past the distal end of the eyelet member 13. After the cannula 11 has been inserted into the eyelet member 13, a crimping pressure is applied to the outer surface of the stem 28 preferably by a plurality of oppositely disposed die members pressing radially inwardly sufficiently to deform the metal of the stem 28 inwardly into locking sealing engagement with the cannula 11. Generally visible longitudinally extending ridges 36 are formed in the surface of the stem 28. By this method the metal in the stem 28 is forced radially inwardly into firm pressure engagement with the cannula 11 over a portion of the length thereof disposed in the passage 21, so that the inner surface of the stem 28 frictionally and sealably engages the cannula 11 without, however, deforming the cannula 11 or altering the inner diameter of the cannula 11.

In the modified form of the invention shown in FIG. 4, a hypodermic needle cannula 40 is fixedly mounted in the discharge outlet 41 of a molded plastic hypodermic syringe 42 in a manner similar to that shown in FIGS. 1 and 2. Thus, the hypodermic syringe 42 having an elongated rigid cylindrical barrel section 43, preferably adapted to having a piston member 44 slidably and sealably disposed therein, is provided with a reduced diameter discharge end section 46. The end section 46 has an axial passage 47 extending therethrough which is coaxial with the barrel section 43. The passage 47 is formed of a relatively small diameter end portion 48 and a larger diameter intermediate portion 49 spaced inwardly therefrom with a shoulder portion 50 formed therebetween. A metal eyelet member or section 55 is adapted to be fixedly and sealably disposed in the end portion 48 of the axial passage 47.

The metal eyelet member 55, like the eyelet member 13, is preferably formed of a cylindrical metal body portion 56 and has a generally cylindrical metal stem section 57 which is adapted to extend axially beyond the discharge end section 46. An axial passage 58 extends the length of said eyelet member 55. In the preferred form the body portion 56 is provided with an outwardly extending flange 59 at its distal end. The eyelet member 55 is preferably inserted through the open end of the syringe barrel 43, and the metal body portion 56 is pressed into frictional sealing engagement with the discharge end section 46 within the end portion 48 of the passage 47. The stem section 57 projects outwardly beyond the end of the axial passage 47 when the eyelet member is fixedly and sealably mounted in the discharge end section 46 of the hypodermic syringe 42. If desired, the eyelet member can be molded in the end section 46 of the syringe 42 at the time the syringe is molded with the stem section 57 extending beyond the end section 46. As in the form of the invention shown in FIGS. 1 and 2, a pointed cannula is fixedly and sealably mounted in the stem section 57 by inserting the hypodermic cannula 40 into the axial passage 47 of the eyelet member 55 and a radially inwardly compression force applied to the outer surface of the stem section 57 to deform the stem section sufficiently to form a sealable locking engagement between the stem section 57 and the cannula 40.

It will be understood that the preformed hypodermic needle supporting structures specifically disclosed herein have been shown as molded from a thermoplastic material, such as polypropylene plastic, but it should be clearly understood that any suitable plastic material can be used for molding a hypodermic needle hub, a hypodermic syringe body, or the like structure which requires the mounting therein of a hypodermic needle. Suitable plastic materials include polyethylene, methylacrylate and polyamide plastics. And, while the preformed hypodermic needle structures are preferably molded, it is, of course, possible to form the support structures in any other way desired, such as on a screw machine or the like. Nor is the present invention limited to having the preformed needle support structure made of a synthetic or natural plastic material, as the preformed units can be made of special metal alloys, ceramic materials, or the like.

By forming the eyelet section of a suitable metal, it will be apparent to one skilled in the art that an eyelet member can be sealably and fixedly mounted or disposed in any of the foregoing preformed needle support structures, and also that by the application of suitable pressure on the stem section, the eyelet member can be brought into sealable locking engagement with a cannula inserted therein.

It will also be apparent from the foregoing disclosure that the present invention results not only in a substantial saving in the cost of the stock material but also a saving due to the fact that the output of a plastic hub molding apparatus and an eyelet drawing machine together can produce in a given period of time about four to six times the number of metal hubs which can be produced by a screw machine. Consequently, with the high output obtained from the preferred plastic molding and metal eyelet forming machines and the reduced cost of the stock material required, the overall reduction in cost of the composite plastic-metal eyelet hub assembly is as much as half that of the conventional metal hub manufactured on screw machines. Also, since the more economical composite hub assembly above described can be used in precisely the same manner as a conventional metal hub be insertion therein of a pointed conventional hypodermic needle cannula followed by crimping of the metal stem section about the cannula, it will be evident that it is possible to produce high quality hypodermic needle and hub assemblies or the like structures having a cannula fixedly held therein by a secure metal-to-metal engagement at a substantially reduced cost.

In compliance with the requirements of the patent statutes I have herein shown and described a preferred embodiment of the invention. It is, however, to be understood that the invention is not limited to the precise construction herein shown, the same being merely illustrative of the principles of the invention. What we claim as new and desired to be secured by Letters Patent is set forth in the attached claims:

1. A hypodermic needle support structure comprising in combination; a plastic main support member having a passage extending longitudinally therethrough which provides access to the interior of said support member from either end thereof with said support member having at the outer end a rigid support section, a generally tubular metal eyelet member disposed in fluid-sealing engagement with said support section and forming a fixed fluid-sealing engagement with a hypodermic needle cannula, said eyelet member having at the inner end thereof a skirt section with a diameter larger than the outer diameter of said hypodermic needle cannula and with said skirt section forming said fluid-sealing engagement with said support section, and said eyelet member having extending axially from the outer end of said skirt section a tubular stem section which extends longitudinally beyond the end of said support section, and said stem section forming said fixed fluid-sealing engagement with said hypodermic needle cannula at a point spaced axially beyond said outer end of said support section.

2. A hypodermic needle support structure comprising in combination; a plastic main hypodermic needle hub member having a passage extending longitudinally therethrough which provides access to the interior of said hub member from either end thereof with said hub member having at the outer end a rigid support section, a generally tubular metal eyelet member disposed in fluid-sealing engagement with said support section and forming a fixed fluid-sealing engagement with a hypodermic needle cannula, said eyelet member having at the inner end thereof a skirt section with a diameter larger than the outer diameter of said hypodermic needle cannula and with said skirt section disposed within said rigid support section and forming said fluid-sealing fixed engagement with said support section, and said eyelet member having extending axially from the outer end of said skirt section a reduced diameter tubular stem section which extends longitudinally beyond the end of said support section, and said stem section forming said fixed fluid-sealing engagement with said hypodermic needle cannula at a point spaced axially beyond said outer end of said support section.

3. A hypodermic needle support structure comprising in combination; a plastic main hypodermic syringe barrel member having a passage extending longitudinally therethrough which provides access to the interior of said barrel member from either end thereof with said syringe barrel member having at the outer end a rigid support section, a generally tubular metal eyelet member disposed in fluid-sealing engagement with said support section and forming a fixed fluid-sealing engagement with a hypodermic needle cannula, said eyelet member having at the inner end thereof a skirt section with a diameter larger than the outer diameter of said hypodermic needle cannula and with said skirt section disposed within said rigid support section and forming said fluid-sealing engagement with said support section, and said eyelet member having extending axially from the outer end of said skirt section a reduced diameter tubular stem section which extends longitudinally beyond the end of said support section, and said stem section forming said fixed fluid-sealing engagement with said hypodermic needle cannula at a point spaced longitudinally beyond said outer end of said support section.

References Cited by the Examiner
UNITED STATES PATENTS

| | | | |
|---|---|---|---|
| 2,211,537 | 8/1940 | Dickinson | 128—221 |
| 2,219,089 | 10/1940 | Everett | 128—221 |
| 2,408,882 | 10/1946 | Robbins | 29—517 |
| 2,460,039 | 1/1949 | Scherer et al. | 128—218 |
| 2,686,359 | 8/1954 | Spencer | 29—517 |
| 2,844,149 | 7/1958 | Gettig | 128—221 |
| 2,874,459 | 2/1959 | Haldeman | 29—517 |
| 2,880,725 | 4/1959 | Kendall | 128—218 |
| 3,043,304 | 7/1962 | Higgins | 128—218 |
| 3,073,307 | 1/1963 | Stevens | 128—221 |
| 3,074,159 | 1/1963 | Baldwin et al. | 128—221 |

RICHARD A. GAUDET, *Primary Examiner.*

JORDON FRANKLIN, *Examiner.*